United States Patent [19]

Watanabe et al.

[11] Patent Number: 5,050,231
[45] Date of Patent: Sep. 17, 1991

[54] RELIEF IMAGE SCANNER

[75] Inventors: Naohiro Watanabe; Takehito Sekiguchi; Tohru Kitagawa; Shunji Sakai, all of Tokyo, Japan

[73] Assignee: Oki Electric Industry Co., Ltd., Tokyo, Japan

[21] Appl. No.: 507,468

[22] Filed: Apr. 11, 1990

[30] Foreign Application Priority Data

Apr. 12, 1989 [JP] Japan .................................... 1-92373
Jul. 13, 1989 [JP] Japan .................................... 1-181910

[51] Int. Cl.$^5$ ......................... G06K 7/00; G06K 9/48; G06K 7/04
[52] U.S. Cl. ........................................ 382/58; 382/16; 382/22; 382/62; 382/65; 235/448
[58] Field of Search ...................... 382/16, 22, 58, 65, 382/62, 55; 235/448

[56] References Cited

U.S. PATENT DOCUMENTS 3,774,015 11/1973 Lockard ............................. 235/448
4,628,195 12/1986 Baus .................................. 235/448
4,845,770 7/1989 Koshida ............................. 382/65
4,878,125 10/1989 Katayama et al. ................. 358/443

FOREIGN PATENT DOCUMENTS

60-144884 7/1985 Japan .

Primary Examiner—Leo H. Boudreau
Assistant Examiner—Steven P. Fallon
Attorney, Agent, or Firm—Spencer & Frank

[57] ABSTRACT

A relief image scanner scans successive linear areas on an information-carrying medium such as a plastic card, illuminating each area from two different directions. The reflected light is converted to first gray-level data when the illumination is from one direction, and to second gray-level data when the illumination is from the other direction. The second gray-level data are subtracted from the first gray-level data; then the difference, and its additive inverse, are compared with a threshold to detect edges of relief patterns on the card, and pairs of edges are connected to create an accurate, distortion-free image of the relief. Additional facilities may be provided to extract edge skeletons before joining the edges, and to capture printed information by binarizing the gray-level data.

8 Claims, 5 Drawing Sheets

| PATTERN NO. | b0 | b1 | b2 | b3 | b4 | b5 | b6 | b7 |
|---|---|---|---|---|---|---|---|---|
| 1 | x | x | x | 0 | 1 | 0 | x | x |
| 2 | x | x | 0 | 1 | 1 | 0 | x | x |
| 3 | x | x | 0 | 1 | 1 | 1 | 0 | x |
| 4 | x | 0 | 1 | 1 | 1 | 1 | 0 | x |
| 5 | x | 0 | 1 | 1 | 1 | 1 | 1 | 0 |
| 6 | 0 | 1 | 1 | 1 | 1 | 1 | 1 | 0 |
| 7 | 0 | 1 | 1 | 1 | 1 | 1 | 1 | 1 |

FIG. 5

| E' | F' | Y |
|---|---|---|
| 1 | 0 | 1 |
| 0 | 1 | 0 |
| 0 | 0 | UNCHANGED |

RELIEF IMAGE SCANNER

BACKGROUND OF THE INVENTION

This invention relates to a relief image scanner for reading or capturing a relief image from the surface of an information-carrying medium such as a plastic card or metal plate.

Plastic cards such as credit cards, bank cards, and hospital patient cards are often embossed with raised letters and numbers giving a name, identification number, account number, or other information. Alternatively, such information may be stamped into the card, the letters and numbers being formed as depressions in the surface of the card. It is often desirable to transfer the information to an electronic data-processing system, for which purpose the surface of the card must be scanned by a device capable of detecting embossed or stamped patterns. (Such patterns will be referred to generally as relief patterns below.) At the same time it may be desirable to capture information printed or otherwise provided on flat portions of the card, such as the card owner's signature and photograph. (Such information will generally be referred to as printed information below.)

Prior-art apparatus for capturing images of relief patterns comprises a television camera and four light sources. The four light sources, which are disposed around the four sides of the card, illuminate the card from four directions in succession. When each light source is turned on, the relief casts shadows which are detected by the television camera and stored in a memory. The four shadow images are then combined by OR logic, yielding a total image of the relief.

This apparatus is unsatisfactory due to its large size, since it requires four separate light sources. The television camera is also large and expensive.

A further problem is that since the angles of illumination vary at different positions on the card, the shadows are of different lengths, which distorts the image.

Another type of image distortion that often occurs is that the captured image shows only the outlines of the relief. If the relief comprises depressions, outline images are formed when the depressions are so wide that they are not entirely filled by the shadows. If the relief comprises raised characters, then outline images are always formed, and there is a tendency for the outlines of adjacent characters to run together. Such outline images look unnatural to the eye, and are difficult for computer-based character recognition systems to identify accurately.

Still another problem occurs if the card also contains printed information or a printed background pattern, which may be mistaken by the television camera for part of the relief pattern.

Yet another problem is that the prior-art apparatus is unsuitable for capturing images of printed information, which must accordingly be acquired by a separate scanner.

SUMMARY OF THE INVENTION

An object of the present invention is accordingly to provide a compact, low-cost relief image scanner.

Another object is to capture relief images without distortion.

Still another object is to capture both relief images and printed images.

Yet another object is to distinguish relief images from printed images.

A relief image scanner according to the present invention has an optical scanning means for illuminating each of a succession of linear areas on the surface of an information-carrying medium from a first direction and from a second direction, and converting the reflected light to an analog electrical signal. An A/D converter converts the analog electrical signal to first gray-level data during illumination from the first direction and to second gray-level data during illumination from the second direction. A ternarizing means compares first gray-level data with second gray-level data, produces a first edge signal if the first gray-level data exceeds the second gray-level data by a certain threshold, and produces a second edge signal if the second gray-level data exceeds the first gray-level data by this threshold. A connecting means sets binary output data to a first state when a first edge signal is produced and to a second state when a second edge signal is produced, the binary output data not being changed when neither the first edge signal nor the second edge signal is produced.

The relief image scanner may also have a skeletonizing means, disposed between the ternarizing means and the connecting means, for selecting one of a series of consecutive first edge signals or consecutive second edge signals and furnishing only the selected edge signals to the connecting means.

For capturing printed information, the relief image scanner may furthermore have a binarizing means for converting gray-level data to binary output data, and a switch for directing gray-level data from the A/D converter either to the ternarizing means or to the binarizing means.

DETAILED DESCRIPTION OF THE PREFERRED EMBODIMENT

A novel relief image scanner for capturing images of both relief and printed information from the surface of an information-carrying medium will be described below with reference to the drawings. The information-carrying medium will be shown as a plastic card embossed with raised letters, but it will be apparent that the invention is equally applicable to media with stamped relief patterns formed by depressions.

Figure 1:
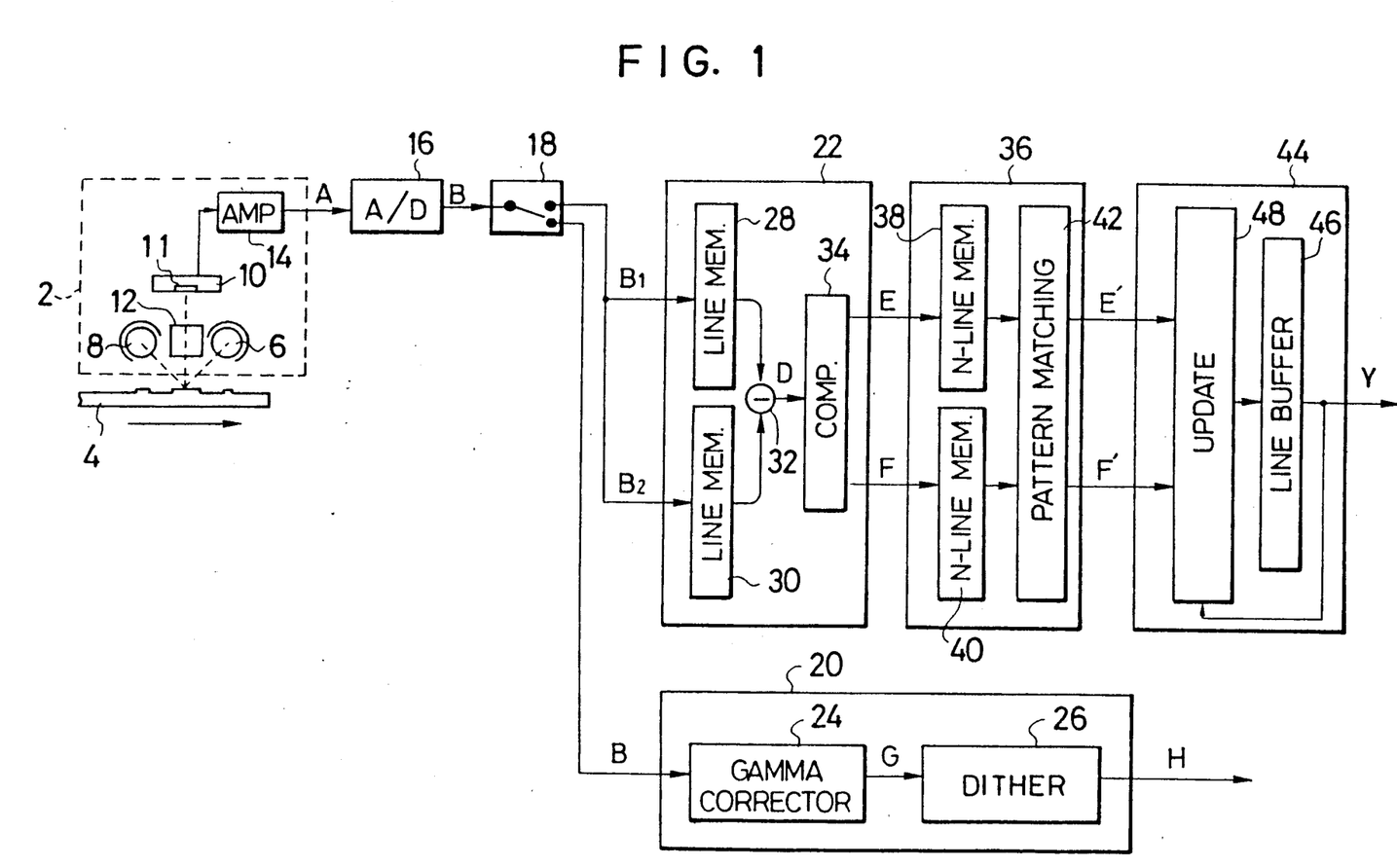
FIG. 1 is a block diagram of the invented relief image scanner.

With reference to FIG. 1, the relief image scanner has an optical scanning means 2 which illuminates a plastic card 4 from two directions and converts the reflected light to an analog electrical signal A. The optical scanning means 2 comprises a first linear light source 6, which illuminates a linear area on the plastic card 4 from a first direction, and a second linear light source 8, which illuminates the same linear area from a second direction. The first linear light source 6 and the second linear light source 8 are disposed parallel to each other and parallel to the surface of the plastic card 4, the linear light sources and the linear area they illuminate extending perpendicular to the page in the drawing.

Light reflected from the plastic card 4 is detected by a line sensor 10 disposed parallel to the two light sources, at a position substantially midway between the two light sources as seen from the surface of the plastic card 4. The line sensor 10 comprises a row of transducers 11, the row, extending perpendicular to the page in the drawing, each transducer 11 converting optical input to electrical output. For example, the line sensor 10 may be a semiconductor charge-coupled device in which incident light generates electrical charges that accumulate in the transducers 11 in amounts proportional to the brightness level. After accumulation, the charges can be sequentially read out from the transducers 11 as a voltage signal.

A rod lens 12 comprising a row of parallel lens elements, the row again extending perpendicular to the page in the drawing, is disposed between the line sensor 10 and the surface of the plastic card 4 to convey light reflected from the linear area to the transducers 11. An amplifier 14, which is electrically coupled to the line sensor 10, amplifies the electrical outputs from the transducers 11, thus generating the analog electrical signal A.

A linear area on the surface of the plastic card 4 can be considered to comprise a row of mutually adjacent pixels, corresponding to the lens elements in the rod lens 12 and the transducers 11 in the line sensor 10. Light reflected from a single pixel is received at a single transducer 11 and converted to a single electrical output. The word pixel will also be used below to refer to an arbitrary position in the row, i.e. to a specific transducer 11 and the part of the image seen by this transducer 11.

The optical scanning means 2 is electrically coupled to an analog-to-digital (A/D) converter 16 which receives the analog electrical signal A and converts it to gray-level data B. The A/D converter 16 may be, for example, an eight-bit A/D converter producing eight-bit data B representing voltage levels of the analog electrical signal A. Gray-level data produced when the first linear light source 6 is on and the second linear light source 8 is off will be referred to as first gray-level data $B_1$. Gray-level data produced when the first linear light source 6 is off and the second linear light source 8 is on will be referred to as second gray-level data $B_2$.

The gray-level data B are sent from the A/D converter 16 to a switch 18, which directs the gray-level data to a binarizing means 20 or a ternarizing means 22.

The binarizing means 20, which is used in capturing images of printed information, comprises a gamma correction means 24 and a dithering means 26. The gamma correction means 24 receives the gray-level data B, modifies the gray-level data B according to a gamma curve which will be shown later, and produces gamma-corrected gray-level data G. The dithering means 26, which is electrically coupled to the gamma correction means 24, converts the gamma-corrected gray-level data G to binary output data H by comparing the gamma-corrected gray-level data G with a dither matrix.

The ternarizing means 22, which is used in capturing relief images, receives gray-level data B comprising first gray-level data $B_1$ and second gray-level data $B_2$ from the A/D converter 16 via the switch 18. The ternarizing means 22 has a first line memory 28 for storing first gray-level data $B_1$ from a single linear area on the surface of the plastic card 4, and a second line memory 30 for storing second gray-level data $B_2$ from the same linear area. A subtraction means 32 subtracts data stored in a location in the second line memory 30 from data stored at the corresponding location in the first line memory 28 to produce a difference value D. A comparison means 34 compares the difference D and its additive inverse $-D$ with a threshold S. If $D > S$, the comparison means 34 produces a first edge signal E. If $-D > S$, the comparison means 34 produces a second edge signal F.

The first and second edge signals E and F are sent to a skeletonizing means 36, which stores them in a first N-line memory 38 and a second N-line memory 40. Here N is an integer greater than one. The first N-line memory 38 stores first edge signals E produced from N successive linear areas on the surface of the plastic card 4. The second N-line memory 40 stores second edge signals F produced from the same areas. From the first and second N-line memories, the first and second edge signals E and F are supplied to a pattern matching means 42, which has the following function. Given a series of consecutive first edge signals E as inputs, the pattern matching means 42 selects just one first edge signal E' for output. Similarly, given a series of consecutive second edge signals F, the pattern matching means 42 selects just one second edge signal F' for output. Details of this operation will be shown later.

The first and second edge signals E' and F' selected by the skeletonizing means 36 are supplied to a connecting means 44. The connecting means 44 comprises a line buffer 46 for storing binary output data Y representing an illuminated linear area on the surface of the plastic card 4, and an updating means 48 for updating contents of the line buffer 46 according to the selected first and second edge signal E' and F'. More specifically, the updating means 48 sets binary output data in the line buffer 46 to a first state, such as the binary value "1," when a first edge signal E' is produced, and to a second state, such as the binary value "0," when a second edge signal F' is produced. The binary output data Y do not change when neither a first edge signal E' nor a second edge signal F' is present.

The binarizing means 20, the ternarizing means 22, the gamma correction means 24, and the dithering means 26 can be built from well-known electronic components. Alternatively, they can be implemented in a microcomputer system comprising, for example, a microprocessor and external memory. In this case the functions of the gamma correction means 24, the dithering means 26, the subtraction means 32, the comparison means 34, the pattern matching means 42, and the updating means 48 can all be executed by the microprocessor under control of a suitable program, with storage for the first line memory 28, the second line memory 30, the first N-line memory 38, the second N-line memory 40, and the line buffer 46 being furnished by the external memory. Details will be readily apparent to one skilled in the art.

The relief image scanner can operate in two modes: a first mode in which it captures relief patterns on the plastic card 4, and a second mode in which it captures printed information on the card. Operation in the first mode will be described with reference to FIGS. 2 to 6, and operation in the second mode with reference to FIG. 7.

In both the first and second modes, the plastic card 4 moves in the direction of the arrow in FIG. 1, so that a succession of mutually adjacent linear areas on the surface of the plastic card 4 are illuminated. An image of the entire surface of the plastic card 4 can thus be captured.

Figure 2:
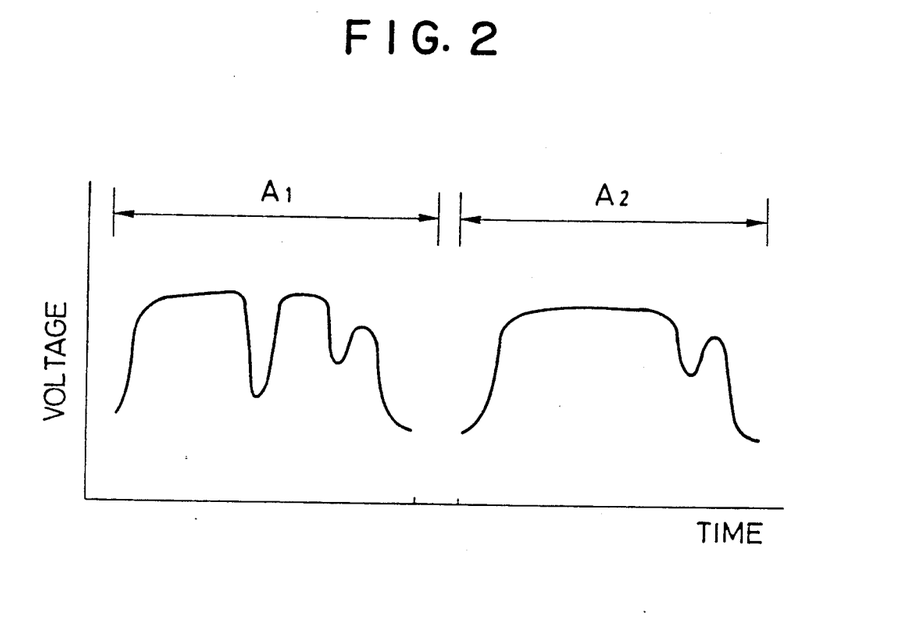
FIG. 2 shows examples of analog electrical signals produced by the optical scanning means in FIG. 1.

In the first mode, for each linear area, first the first linear light source 6 is switched on, the second linear light source 8 is switched off, and the resulting electrical outputs from the transducers 11 in the line sensor 10 are sequentially amplified by the amplifier 14 to produce an analog electrical signal $A_1$. Then the first linear light source 6 is switched off, the second linear light source 8 is switched on, and the resulting electrical outputs from the transducers 11 in the line sensor 10 are sequentially amplified by the amplifier 14 to produce an analog electrical signal $A_2$. FIG. 2 shows an example of the analog electrical signals $A_1$ and $A_2$ from a single linear area.

In flat regions on the surface of the plastic card 4, light from the first and second light sources 6 and 8 will be reflected with equal intensity and the two signals $A_1$ and $A_2$ will be equal, even if the flat region contains printed patterns or characters. In areas that slope toward one of the two light sources and away from the other, light from one of the two light sources will be reflected more strongly than light from the other light source, causing the two signals $A_1$ and $A_2$ to differ.

The A/D converter 16 converts the signal $A_1$ to first gray-level data $B_1$, and the signal $A_2$ to second gray-level data $B_2$. The switch 18 is set to the upper position in FIG. 1, so the first and second gray-level data $B_1$ and $B_2$ are sent to the ternarizing means 22 and stored, respectively, in the first line memory 28 and the second line memory 30. After the gray-level data $B_1$ and $B_2$ for an entire linear area have been stored, they are read from the first and second line memories 28 and 30, subtracted in the subtraction means 32, and compared by the comparison means 34 with the threshold S.

Figure 3:
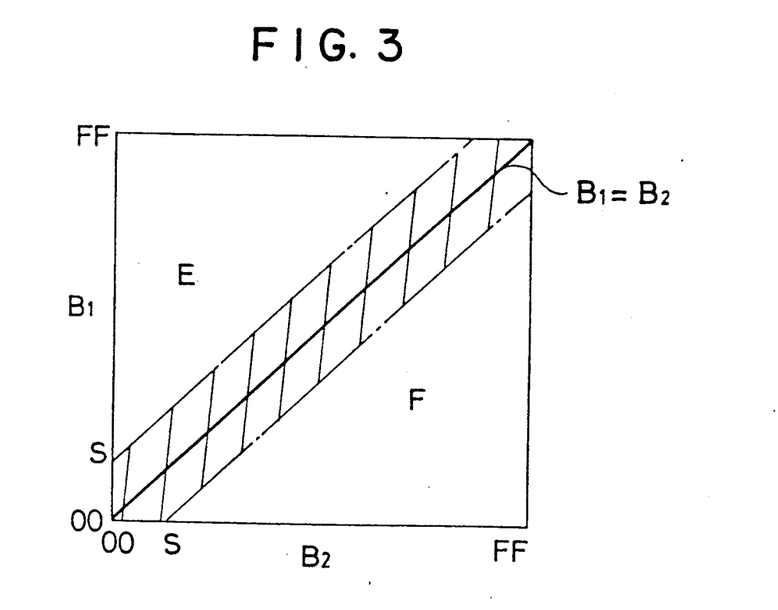
FIG. 3 is a graph illustrating the operation of the ternarizing means in FIG. 1.

The operation performed by the ternarizing means 22 is illustrated graphically in FIG. 3. The vertical axis represents the first gray-level data $B_1$ for an arbitrary pixel, and the horizontal axis represents the second gray-level data $B_2$ for the same pixel, these two data being stored at corresponding locations in the first and second line memories 28 and 30 and subtracted to obtain the difference D. In the upper left part of the graph, $$B_1 - B_2 = D > S$$

and a first edge signal E is produced. In the lower right part, $$B_2 - B_1 = -D > S$$

and a second edge signal F is produced. In the middle (hatched) part, $$|B_1 - B_2| = |D| \leq S$$

and neither a first edge signal E nor a second edge signal F is produced.

In the first N-line memory 38, a binary "1" digit is stored to represent the presence of a first edge signal E, and a binary "0" digit to represent the absence of a first edge signal E. Similarly, binary "1" and "0" digits are stored in the second N-line memory 40 to represent the presence and absence of the second edge signal F. As each new "1" or "0" bit is stored, the other bits corresponding to the same pixel are shifted to make room for it, the oldest bit being discarded. For each pixel, the first and second N-line memories 38 and 40 operate like a pair of shift registers, new bits being shifted in at one side as new linear areas are scanned, and old bits being shifted out at the other side. At any given moment, for each pixel, the N-line memories 38 and 40 each contain N bits representing the presence and absence of the first and second edge signals E and F in the N linear areas most recently scanned by the optical scanning means 2.

Figure 4:
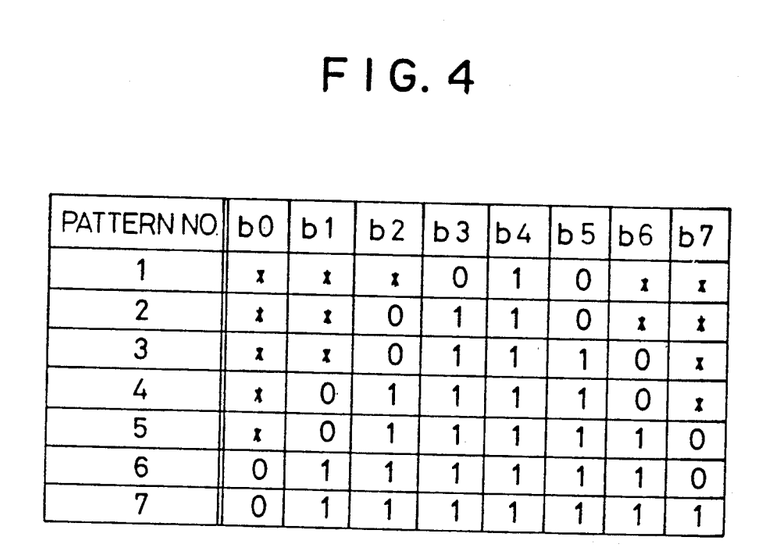
FIG. 4 is a chart illustrating patterns used by the skeletonizing means in FIG. 1.

The pattern matching means 42 operates on these N bits by testing them against a set of patterns, producing a "1" output if the N bits match one of the patterns in the set, and producing a "0" output if the N bits do not match any of the patterns. FIG. 4 shows a set of seven patterns that can be used when N=8. Each row in FIG. 4 is one pattern, comprising bits b0 to b7. An asterisk (*) represents a don't-care bit, which matches either a "1" or a "0." Each pattern comprises zero or more don't-care bits, followed by a single "0" bit representing absence of an edge signal, followed by one or more "1" bits representing presence of an edge signal, followed by zero or one "0" bit, followed by zero or more don't-care bits.

At a given pixel position, a physical edge of the relief pattern on the plastic card 4 is represented by one or more consecutive edge signals E or F, the number of consecutive edge signals being equal to the number of adjacent linear areas over which the edge extends. Each such series of consecutive edge signals generates a match with one of the patterns in FIG. 5 just once, causing a single "1" output, representing the presence of a selected edge signal E' or F', from the skeletonizing means 36. If the edge is not wider than eight consecutive linear areas, the match will be produced at a point substantially midway between the top and bottom of the edge.

The skeletonizing means 36 performs the above operation twice separately for each pixel: once to test the N bits stored for that pixel in the first N-line memory 38, to decide whether to produce the signal E', and once to test the N bits stored for that pixel in the second N-line memory 40, to decide whether to produce the signal F'.

Figure 5:
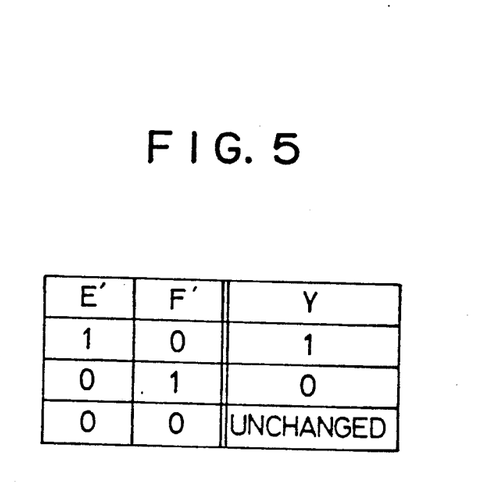
FIG. 5 is a table illustrating the operation of the connecting means in FIG. 1.

The binary output data Y in the line buffer 46 are initialized to all "0" before the beginning of the scan. Then as each linear area on the plastic card 4 is scanned, the updating means 48 updates the data in the line buffer 46 according to the signals E' and F'. The updating logic is illustrated in FIG. 5. If E'=1 and F'=0 for a given pixel, the output bit Y for that pixel is set to "1." If E'=0 and F'=1, the output bit Y is set to "0." If E'=0 and F'=0, the output bit Y is left unchanged. Note that it is not possible for E' and F' both to be "1."

Figure 6:
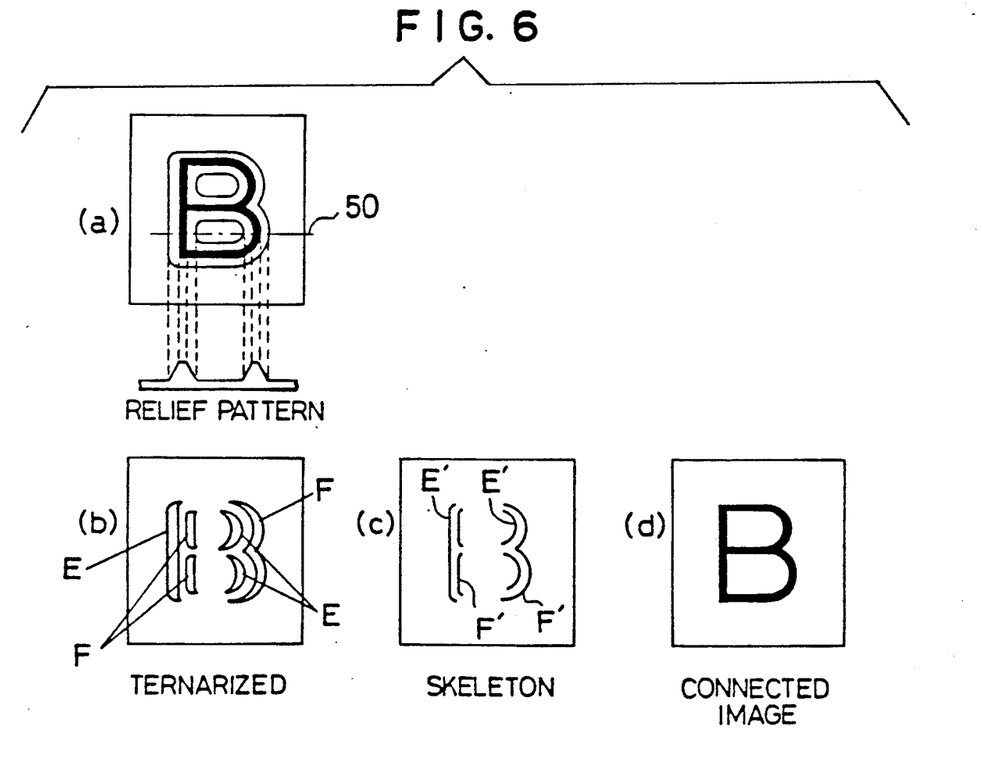
FIG. 6 is a schematic drawing illustrating the capture of an image of an embossed letter.

FIG. 6 shows how the preceding operations capture an image of an embossed pattern of the letter B. A plan view of the letter and a cross section at the position of a pixel 50 are shown at (a) in FIG. 6. The ternarizing means 22 outputs signals E and F for the parts indicated at (b) in FIG. 6, detecting edges of the relief that are substantially parallel to the rod lens 12. The skeletonizing means 36 reduces these edges to skeleton lines as shown at (c) in FIG. 6. The connecting means 44 connects the skeleton edges to produce output data representing the image shown at (d) in FIG. 6, "1" bits representing the the black portions and "0" bits the white portions. This image accurately reproduces the pattern at (a) in FIG. 6.

Since the ternarizing means 22 operates on the difference between the first and second gray-level data $B_1$ and $B_2$, the image represented by the binary output data Y represents only the relief pattern on the plastic card 4. It does not include printed information, which reflects the light from the first and second light sources 6 and 8 equally. Since all areas on the plastic card 4 are illuminated from the same angles by the first linear light source 6 and the second linear light source 8, the image is free of distortion. Moreover, both embossed and stamped relief patterns are captured accurately; in either case the image fills areas between substantially the midlines of complementary pairs of edges. False outline images are not produced as in the prior art.

Next, the second mode of operation will be described.

In the second mode, it suffices for just one of the two light sources, either the first linear light source 6 or the second linear light source 8, to be switched on. Alternatively, both the first linear light source 6 and the second linear light source 8 can be switched on to reduce shadows cast by relief. Each linear area on the plastic card 4 is scanned just once, producing one line of gray-level data B. The switch 18 is set to the lower position in FIG. 1 to direct the gray-level data B to the gamma correction means 24.

Figure 7:
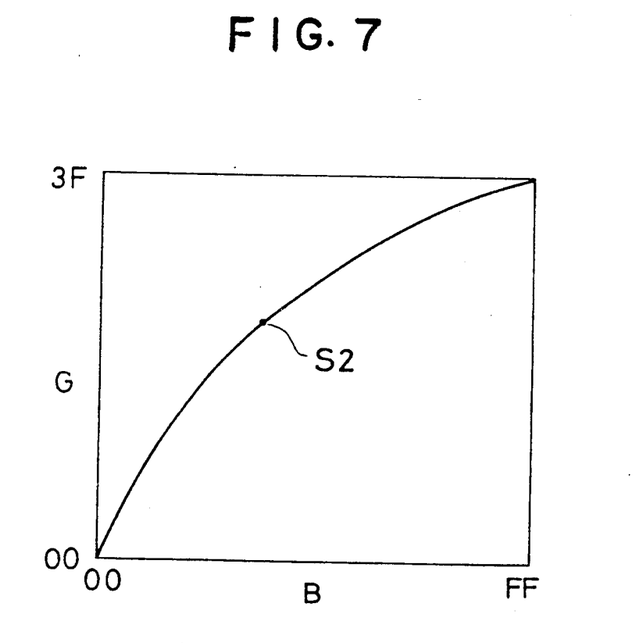
FIG. 7 is a graph illustrating the operation of the gamma correction means in FIG. 1.

The operation of the gamma correction means 24 is illustrated in FIG. 7. The input gray-level data B, shown as eight-bit data, are converted to six-bit gamma-corrected gray-level data G according to a gamma curve S2. The purpose of this correction is to compensate for non-linearity in the response of the line sensor 10.

The dithering means 26 converts the gamma-corrected gray-level data G to binary output data H in which "1" and "0" bits represent black and white dots, different gray levels being represented by different densities of black dots. More specifically, the dithering means 26 compares the gamma-corrected gray-level data G with a dither matrix comprising a plurality of different threshold values. Further details of the dithering process will be omitted since they are well known. Dithering enables the binary output data H to represent not only printed lines, letters and numerals but also halftone pictorial information such as a photograph of the card owner.

The mode of operation should be selected according to the type of image (relief or printed) to be captured from the card. When it is necessary to capture both relief and printed images, each linear area on the card can be scanned once in the first mode and once in the second mode before the card is moved to the next linear area, enabling both types of information to be acquired in a single, integrated operation, so that the card has to be inserted in the scanner only once. In this integrated mode of operation, relief information can easily be distinguished from printed information: relief information comprises all information present in the binary output data Y; printed information comprises information present in the binary output data H but not present in the binary output data Y.

The binary output data Y and/or H can be printed directly as bit-mapped images, or supplied to a character-recognition system that recognizes characters such as the letter B at (d) in FIG. 6 and converts such characters to computer codes. Relief and printed information can thus be conveniently transferred from a card to a printed receipt, or to a computerized data-processing system.

Compared with the prior art, the novel relief image scanner is smaller in size and lower in cost, since it requires only two light sources instead of four and only a simple line sensor instead of a large, expensive television camera. The image is free of distortion because the angles of illumination are the same for all areas. As noted above, the image is also free of outline distortion, and relief can be accurately distinguished from printed patterns.

The structures shown in the drawings can be modified in various ways without departing from the spirit and scope of the invention. Examples of such modifications include but are not restricted to the following.

If gray-level output of printed information is desired, the dithering means 26 can be omitted and the output of the gamma correction means 24 used directly. If it is only necessary to capture relief images, the switch 18 and the binarizing means 20 can be omitted, the A/D converter 16 then being coupled directly to the ternarizing means 22. It is also possible to omit the skeletonizing means 36 and couple the ternarizing means 22 directly to the connecting means 44, although the captured relief image will then be shifted to one side by an amount equivalent to half the height of the relief. It is furthermore possible to scan the information-carrying medium by moving the optical scanning means past the medium, instead of moving the medium past the optical scanning means as shown in FIG. 1.

What is claimed is:

1. An image scanner for capturing a relief image from a surface of an information-carrying medium, comprising:

optical scanning means for illuminating each of a succession of linear areas on said surface from a first direction and from a second direction, and converting light reflected from said linear areas to an analog electrical signal;

an A/D converter, electrically coupled to said optical scanning means, for converting said analog electrical signal to first gray-level data during illumination from said first direction and to second gray-level data during illumination from said second direction;

ternarizing means, electrically coupled to said A/D converter, for comparing said first gray-level data with said second gray-level data, producing a first edge signal if said first gray-level data exceeds said second gray-level data by a certain threshold, and producing a second edge signal if said second gray-level data exceeds said first gray-level data by said threshold;

skeletonizing means, electrically coupled to said ternarizing means, for selecting one of a series of consecutive first edge signals and one of a series of consecutive second edge signals and producing a selected first edge signal and a selected second edge signal; and connecting means, electrically coupled to said skeletonizing means, for setting binary output data to a first state when said selected first edge signal is produced and to a second state when said selected second edge signal is produced, said binary output data not being changed when neither said selected first edge signal nor said selected second edge signal is produced.

2. The scanner of claim 1, for capturing a relief image or a printed image from a surface of an information carrying medium, further comprising:

binarizing means for converting gray-level data to binary output data; and a switch, disposed between said A/D converter and said ternarizing means, for directing gray-level data from said A/D converter either to said ternarizing means or to said binarizing means.

3. The scanner of claim 1, wherein said optical scanning means comprises:

a first linear light source and a second linear light source, disposed parallel to each other and parallel to said surface, for illuminating said surface;

a line sensor disposed parallel to said first linear light source and said second light source, located substantially midway between said first linear light source and said second linear light source as seen from said surface, comprising a row of transducers for converting optical input to electrical output;

a rod lens comprising a row of parallel lens elements, disposed between said line sensor and said surface, for conveying light reflected from a linear area on said surface to said transducers; and an amplifier, electrically coupled to said line sensor, for amplifying electrical outputs from said transducers, thus generating said analog electrical signal.

4. The scanner of claim 1, wherein said ternarizing means comprises;

a first line memory for storing first gray-level data representing a linear area on said surface;

a second line memory for storing second gray-level data representing the same linear area on said surface;

subtraction means for subtracting data in a location in said second line memory from data stored at a corresponding location in said first line memory to produce a difference;

comparison means for comparing said difference and the additive inverse of said difference with said threshold, producing said first edge signal when said difference exceeds said threshold, and producing said second edge signal when the additive inverse of said difference exceeds said threshold.

5. The scanner of claim 1, wherein said skeletonizing means comprises:

a first N-line memory, N being an integer greater than one, for storing said first edge signals produced during illumination of N successive linear areas;

a second N-line memory for storing said second edge signals produced during illumination of N successive linear areas;

pattern-matching means for comparing N-bit contents of said first N-line memory and said second N-line memory with a set of N-bit patterns and selecting edge signals at which pattern matches occur.

6. The scanner of claim 5, wherein each of said N-bit patterns comprises, in sequence:

zero or more don't-care bits;

a single bit representing absence of an edge signal;

one or more bits representing presence of an edge signal;

zero or one bit representing absence of an edge signal; and zero or more don't-care bits.

7. The scanner of claim 1, wherein said connecting means comprises:

a line buffer for storing binary output data representing an illuminated linear area on said surface;

updating means for updating contents of said line buffer according to said selected first edge signal and said selected second edge signal.

8. The scanner of claim 2, wherein said binarizing means comprises:

gamma correction means for receiving said gray-level data, modifying said gray-level data according to a gamma curve, and producing gamma-corrected gray-level data; and dithering means, electrically coupled to said gamma correction means, for converting said gamma-corrected gray-level data to binary data by comparing said gamma-corrected gray-level data with a dither matrix.

* * * * *